United States Patent
Hazart

(10) Patent No.: US 7,860,686 B2
(45) Date of Patent: Dec. 28, 2010

(54) PROCESS OF GEOMETRICAL CHARACTERISATION OF STRUCTURES AND DEVICE FOR IMPLEMENTING SAID PROCESS

(75) Inventor: Jerome Hazart, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1692 days.

(21) Appl. No.: 11/076,999

(22) Filed: Mar. 11, 2005

(65) Prior Publication Data
US 2005/0200859 A1    Sep. 15, 2005

(30) Foreign Application Priority Data
Mar. 12, 2004    (FR) ................... 04 50506

(51) Int. Cl.
    G06F 19/00    (2006.01)
    G06F 17/40    (2006.01)
(52) U.S. Cl. ................. 702/189; 356/237.1; 356/237.2; 356/237.5; 356/600; 702/81
(58) Field of Classification Search ............. 356/237.1, 356/237.2, 237.3, 237.4, 237.5, 237.6, 600, 356/601, 625; 382/100, 145, 146, 147; 702/1, 702/81, 82, 84, 127, 187, 189
See application file for complete search history.

(56) References Cited

U.S. PATENT DOCUMENTS

| 5,963,329 | A | 10/1999 | Conrad et al. |
| 6,847,925 | B2* | 1/2005 | Ottusch et al. ................. 703/2 |
| 6,950,190 | B2* | 9/2005 | Smith ......................... 356/446 |
| 7,158,239 | B2* | 1/2007 | Hazart ........................ 356/601 |
| 2003/0158715 | A1* | 8/2003 | Ottusch et al. ................. 703/2 |
| 2003/0200063 | A1 | 10/2003 | Niu et al. |
| 2004/0136003 | A1* | 7/2004 | Smith ......................... 356/432 |
| 2006/0103855 | A1* | 5/2006 | Hazart ........................ 356/625 |
| 2009/0148783 | A1* | 6/2009 | Socha .......................... 430/5 |

FOREIGN PATENT DOCUMENTS

WO    WO 2004/008069 A1    1/2004

OTHER PUBLICATIONS

Babar K. Minhas, et al., "Ellipsometric scatterometry for the metrology of sub-0.1-µm-linewidth structures", Applied Optics, vol. 37, No. 22, Aug. 1998, pp. 5112-5115.
Thomas K. Gaylord, et al., "Analysis and Applications of Optical Diffraction by Gratings", Proceedings of the IEEE, vol. 73, No. 5, May 1985, pp. 894-937.
Roger Petit., et al., "Electromagnetic Theory of Gratings", Topics in Current Physics, Chapter 4, 1980, pp. 102-121.
William H. Press, et al., "Numerical Recipes in C", The art of Scientific Computing Second Edition, Chapter 10, 1992, pp. 394-444.
Emmanuel M. Drege, et al., "Linearized inversion of scatterometric data to obtain surface profile information", Optical Engineering, vol. 41, No. 1, Jan. 2002, pp. 225-236.
Evgeni Popov, et al., "Grating theory: new equations in Fourier space leading to fast converging results for TM Polarization" Optical Society of America, vol. 17, No. 10, Oct. 2000, pp. 1773-1784.

* cited by examiner

Primary Examiner—Edward R Cosimano
(74) Attorney, Agent, or Firm—Oblon, Spivak, McClelland, Maier & Neustadt, L.L.P.

(57) ABSTRACT

A structure, decomposable into at least one elementary structure or base element, is illuminated and then provides an optical response, at least one geometrical parameter of the base element is determined, and a value is attributed to it, a regression algorithm is implemented which determines modified values of the parameter(s), in order to make the difference between the theoretical response of the base element and the acquired result at most equal to a threshold, and to obtain an image of the structure, and as long as the separation between the acquired and theoretical responses is not satisfactory, new subdivisions of the base element(s) are performed.

9 Claims, 7 Drawing Sheets

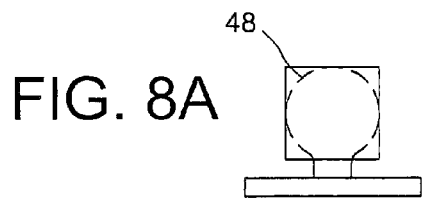
FIG. 8A  FIG. 8B
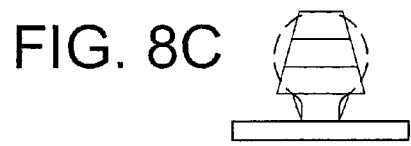
FIG. 8C  FIG. 8D
 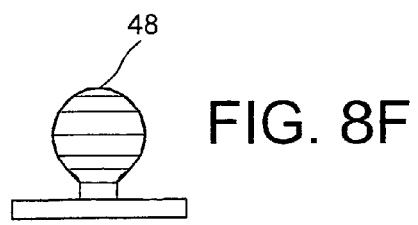
FIG. 8E  FIG. 8F (Step 1) acquiring the optical response of the structure, (Step 2) definding an elementary geometrical structure as a base element capable of enabling decomposition of the structure to be characterised into one or more base elements, (Setp 3) determining at least one geometrical parameter of the base element and attributing a value to each geometrical parameter, (Step 4) implementing a regression of the values of the geometrical parameter(s) of the base element starting from a regression algorithm capable of determining modified values of said geometrical parameter(s) in order to make a difference between a theoretical optical response of the base element, whose geometrical parameter(s) has (have) been determined, and acquired optical response of the structure at most equal to a determined threshold value, and (Step 5) if this difference between the theoretical optical response and the acquired optical response is greater than this threshold value, making a new subdivision of one or more base elements into at least two other base elements, and of each base element the process is recommenced starting from (step 3) thereof; if the difference is less than or equal to the threshold value, a set of base elements is assembled with the determined values of their geometrical parameters to obtain an image of the structure, and if the difference is greater than the threshold value, the process is recommenced at (step 5).

*Fig.10*

PROCESS OF GEOMETRICAL CHARACTERISATION OF STRUCTURES AND DEVICE FOR IMPLEMENTING SAID PROCESS

TECHNICAL FIELD

The present invention concerns a process of geometrical characterisation of structures, as well as a device for implementing this process.

The invention proposes a measure which may be associated with the reconstruction of an image starting from diverse experimental data.

It is particularly applied to checking the dimensions of periodic sub-micrometric objects by means of an optical system.

More precisely, the invention may serve for the geometrical characterisation of regularly spaced patterns, such as "lines" in microelectronics. This technique of characterisation is termed "scatterometry" because it concerns a measurement performed by means of a diffracted electromagnetic field.

For this subject, document [1] will be consulted and, like the other documents cited in what follows, is mentioned at the end of the present description.

More particularly, the invention enables the geometrical characterisation of the shape of "lines" in microelectronics, without using a predefined geometrical model.

We will term "spectrum" or "signature" any optical response of an object or structure which it is desired to measure whether the measurement method is of the reflectometric, goniometric, ellipsometric or spectrometric type. The invention uses a set of techniques enabling the dimensions and shape of this object to be given in a rapid and sure manner.

An important aspect of the invention concerns the processing of the optical data obtained by the measurements performed.

STATE OF THE PRIOR ART

FIG. 1 schematically shows the principle of an optical measurement which may be used in the invention.

A periodic pattern 2 may be seen there, which it is desired to characterise as regards its height h and its width 1. This pattern, which is formed on a substrate 4, is illuminated by light emitted by a light source 6. The reflected light is analysed by appropriate means 8 enabling determination of certain opto-geometric parameters of the pattern so illuminated, these parameters being, as has been seen, the height and the width in the example considered.

The parameter determination is based on the hypothesis that if an ideal object is found theoretically, having a diffraction spectrum equal to the measured spectrum, then the real object and the ideal object are equal.

No direct method exists for going back from the diffraction spectra to the object which diffracted the light in a general manner: the problem is said to be badly conditioned. Since the object cannot be seen (it is too small, which is equivalent to saying that the problem is badly conditioned), let us find an ideal object which diffracts light in the same way as the real object to be characterised. Having the ideal object, we will then have a measurement of the real object.

Starting from this, two main research methods exist: the library method and the iterative method.

We first consider the library method, which is in fact a tabulation method.

The objects are defined by a set of geometrical parameters. For example, for a trapezoidal profile, this profile is described by its height, its width at mid-height and its slope angle. The diffracted spectrum is then calculated of each object forming part of a large collection of objects, in which the geometrical parameters vary. The ideal object is then selected which has given the spectrum closest to the experimental spectrum.

This method has the great disadvantage of calculating the respective spectra of a large number of ideal objects to have a good chance of finding a correct solution, so that a long calculation time is needed for preparing the library.

Furthermore, this library has to be recalculated if the model of the ideal object is modified (for example, on going from a rectangular model to a trapezoidal model), so that the method may need much calculation.

We now consider the iterative method proper.

Here again, the object is defined by a set of opto-geometric parameters. The starting point is an ideal object, assumed to be close to the real object which it is desired to characterise. The spectrum of this ideal object is calculated. From the difference between this spectrum and the experimental spectrum, the variation is deduced which has to be applied to the model to obtain coincidence of the spectra. This is performed iteratively, until the spectra coincide or a better model cannot be found. We will principally consider this iterative method.

Such a method does not always give a unique "measurement", or solution. This is one of the typical difficulties of so-called "inverse" problems. This difficulty is greater, the more the system to be analysed is characterised by a large number of parameters.

A method has already been envisaged of partially circumventing the said difficulty by means of hierarchical treatment of the parameters. According to this technique, the most significant parameters are first determined approximately, and the secondary parameters are then determined, and so on.

This technique may be termed "method of sequences", each "sequence" being an adjustment of the geometrical parameters for a finite and fixed number of these parameters. Parameters are added from one sequence to another. A sequence is denoted $\{x_1, x_2, \ldots x_m\}$. This means that the m geometric variables $x_1, x_2, \ldots x_m$ of the profile are adjusted as well as possible. The following sequence is for example $\{x_1, x_2, \ldots x_{m'}\}$, with m'>m.

Nevertheless, considerable problems remain with this method of sequences. In fact, when to pass from one sequence to another to optimise the calculation time is never exactly known.

Furthermore, how to form a hierarchy of the geometrical variables is not always evident. For example, for a profile with 4 variables, it is not known whether it is better to use the sequence $\{x_1, x_2\}$ and then the sequence $\{x_1, x_2, x_3, x_4\}$, or the successive sequences $\{x_1, x_2\}$, $\{x_1, x_2, x_3\}$ and $\{x_1, x_2, x_3, x_4\}$. The question remains open and depends on the amplitude itself of the variables being sought.

In any case, a geometric model has to be fixed a priori, that is, it has to be known for example that the profile is trapezoidal and does not have other notable defects. This is very restrictive from the point of view of the user, who does not always know what the analytical means will provide.

SUMMARY OF THE INVENTION

The present invention has as its object the resolution of the above problems.

It has as its object a process of geometrical characterisation of a structure, in which the structure is illuminated, this structure then providing an optical response, this process enabling a two-dimensional or three-dimensional image of the structure to be obtained starting from the optical response of this structure, this process being characterised in that it comprises the following successive steps:

(1) the optical response of the structure is obtained,
(2) an elementary geometrical structure, termed base element, is defined, capable of enabling the decomposition into one or more base elements, of the structure to be characterised,
(3) at least one geometrical parameter of the base element is determined and a value is attributed to each geometrical parameter,
(4) a regression is implemented of the values of the geometrical parameter(s) of the base element starting from a regression algorithm capable of determining modified values of said geometrical parameter(s) in order to make the difference between the theoretical optical response of the base element, whose geometrical parameter(s) has (have) been determined, and the acquired optical response of the structure at most equal to a determined threshold value, and
(5) if this difference between the theoretical optical response and the acquired optical response is greater than this threshold value, a new subdivision is made of one or more base elements into at least two other base elements, and for each base element the process is recommenced starting from step (3) thereof; if the difference is less than or equal to the threshold value, the set of base elements is assembled with the determined values of their geometrical parameters to obtain an image of the structure, and if the difference is greater than the threshold value, the process is recommenced at step (5).

According to a particular embodiment of the process which is the subject of the invention, the optical response of the structure is an ellipsometric, reflectomtric or goniometric spectrum or an image of this structure.

The base element may be chosen from among squares, rectangles, trapezia and triangles, or any other base element capable of permitting the decomposition of the structure.

According to a first particular embodiment of the invention, the base element is a square, and the length of sides of this square is used as the geometric parameter.

According to a second particular embodiment of the invention, the base element is a rectangle, and the length and/or width of this rectangle is/are used as geometric parameters.

According to a third particular embodiment of the invention, the base element is a trapezium, and the height and/or at least one of the respective lengths of the large and small bases of this trapezium are used as geometric parameters.

According to a fourth particular embodiment of the invention, the base element is a triangle, and the base and/or an angle adjacent to the latter and/or the height of this triangle, or the base and/or at least one of the two angles adjacent to the latter, is/are used as geometric parameters.

The parameters defined above for each type of base element are given as advantageous embodiments, but they may of course be defined differently.

According to a preferred embodiment of the process which is the subject of the invention, a rigorous analysis method of coupled waves, termed the "RCWA" method (see for example document [2]) or a differential method (see for example document [3]) is used to determine the theoretical optical response of the base element.

The present invention also has as its object a device for geometrical characterisation of a structure, this device comprising:

means for illuminating the structure, this structure then providing an optical response, and means for detecting and processing this optical response, this device being characterised in that the means for detecting and processing the optical response are provided for performing the following successive steps:

(1) acquiring the optical response of the structure,
(2) defining an elementary geometrical structure, termed base element, capable of permitting the decomposition of the structure to be characterised into one or more base elements,
(3) determining at last one geometrical parameter of the base element and attributing a value to each geometrical parameter,
(4) implementing a regression of the values of the geometrical parameter(s) of the base element, starting from a regression algorithm capable of determining modified values of the geometrical parameter(s), in order to make the difference between the theoretical optical response of the base element, whose geometrical parameter(s) have been determined, and the acquired optical response of the structure at most equal to a determined threshold value, and
(5) if this difference between the theoretical optical response and the acquired optical response is greater than this threshold value, performing a new subdivision of one or more base elements into at least two other base elements, and for each base element, recommencing the steps starting from step (3), if the difference is less than or equal to the threshold value, assembling the set of base elements with the determined values of their geometrical parameters to obtain an image of the structure, and if the difference is greater than the threshold value, recommencing the steps starting from step (5).

BRIEF DESCRIPTION OF THE DRAWINGS

The present invention will be better understood on reading the description of embodiment examples given hereinafter, purely as non-limiting indications, with reference to the accompanying drawings in which.

DETAILED DESCRIPTION OF PREFERRED EMBODIMENTS

In scatterometry, particularly in the field of microelectronics, the method most utilised for calculating the spectrum of a theoretical object is the RCWA method, that is, the method of rigorous coupled wave analysis (see for example document [2]).

Other methods exist (for example the Chandezon method, and methods using Green's functions), but the RCWA method has very rapidly been adopted because of its simplicity, rapidity, and quasi-universal nature.

Although it may be implemented with other methods, the present method is extremely well adapted to the RCWA (see document [2]) and to the differential method (see document [3], chapter 4), as will be seen in what follows.

In the case of the RCWA method, when the profile of a line which it is desired to characterise is not rectangular, this profile is cut into slices parallel to the plane of the substrate on which the line is formed. When the RCWA method is used, the base element is therefore rectangular.

But in the case of the differential method, the preferred base element is the trapezium. The shape which it is desired to characterise is therefore cut up into trapezia (see for example document [6]).

If the slices are sufficiently small, the signature of the cut-up object is identical to that of the perfect, non-cut-up object. (Note that the method of Green's functions or the Chandezon method does not make use of cutting up the profile).

Cutting-up is therefore a calculation artefact which permits use of the RCWA or differential methods, which deal only with slices. We note that the refractive index does not change with height in each slice for the RCWA method, and that the calculation time is a linear function of the number of slices or layers.

Figure 1:
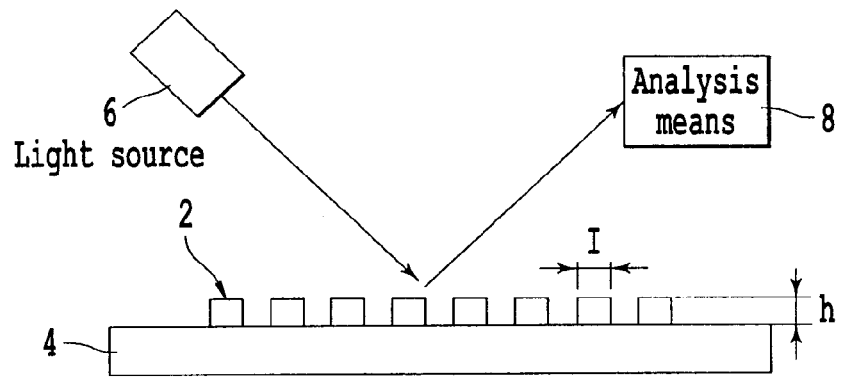
FIG. 1 schematically illustrates the principle of an optical measurement, usable in the invention and already described, FIGS. 2A and 2B schematically show the process of cutting a rounded trapezoidal profile of a line formed on a substrate, this profile being cut into rectangles in the case of FIG. 2A and into trapezia in the case of FIG. 2B.
Figure 2A:
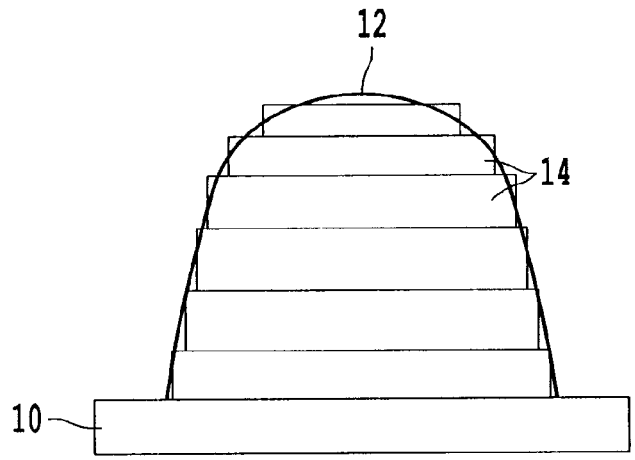
Figure 2B:
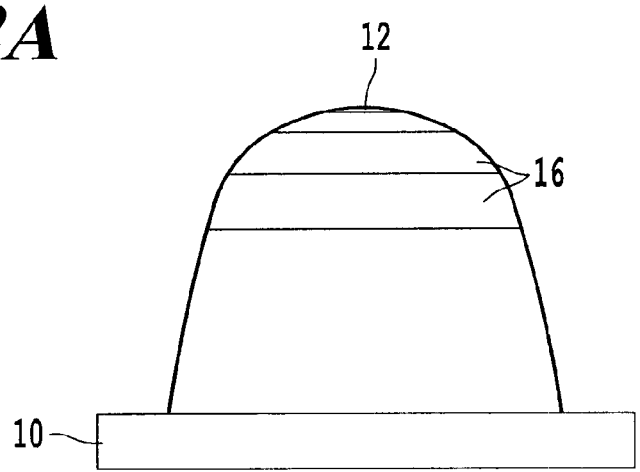

FIGS. 2A and 2B schematically show the process of cutting a rounded trapezoidal profile of a line which is formed on a substrate 10. The uncut profile is referenced 12. In FIG. 2A, this profile is cut up into rectangles 14 for processing by the RCWA method. In FIG. 2B, the profile is cut up into trapezia 16 to be treated by the differential method.

Figure 3:
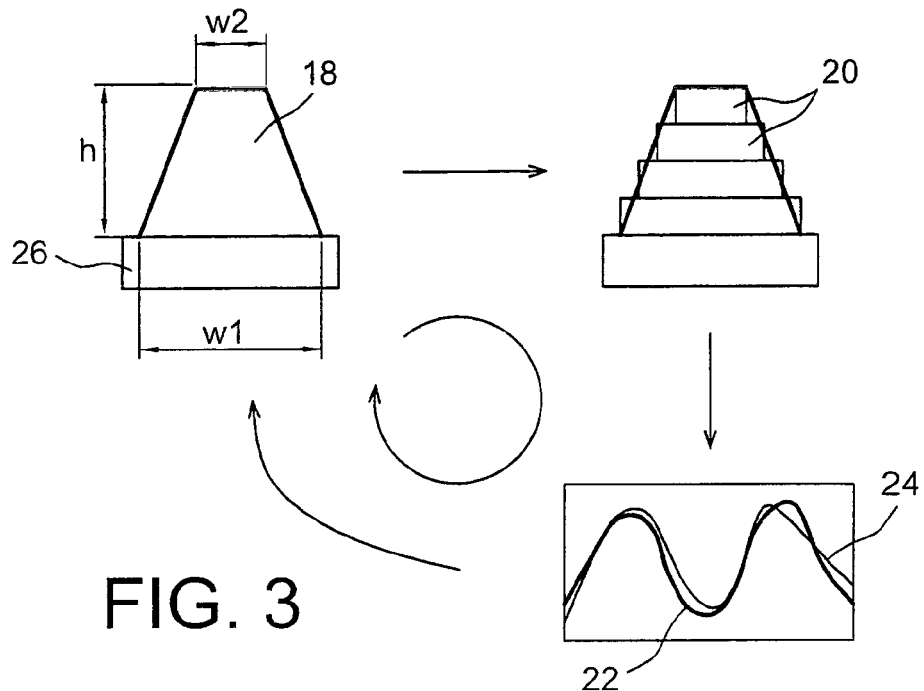
FIG. 3 schematically shows a regression algorithm for scatterometry, known in the state of the art, FIG. 4 schematically shows a regression algorithm for scatterometry, usable in the present invention, FIGS. 5A-5D schematically show an example of the invention, enabling a lithographic pattern to be characterised, FIG. 6 schematically illustrates an example of a notched grid geometry, FIGS. 7A-7F schematically show a first example of the invention, enabling characterisation of a notched grid, FIGS. 8A-8F schematically show a second example of the invention, enabling characterisation of a notched grid, FIG. 9 schematically shows the flow chart of a process according to the invention, and FIG. 10. shows a flow chart for a process of geometrical characterisation of a structure.

In what follows, it is shown in a very generic manner how the quasi-totality of the algorithms are constructed for regression in scatterometry. Reference is made to FIG. 3, which schematically shows an example of a conventional adjustment process.

The geometry 18 studied, defined by a few geometrical parameters, is cut up into rectangles 20 in order to be processed by the RCWA method. The signature 22 of the modelled object is calculated, then compared with the experimental signature 24. From the difference between these signatures, a variation of the geometrical parameters is deduced.

The process is then resumed with a new geometry defined by the modified parameters, and so on, until the difference between the theoretical signature and the experimental signature is less than a predefined threshold.

It is noted that in the example considered the profile of the object studied, which is formed on a substrate 26, is a trapezium; the latter is defined by three parameters: its large base, of initial length w1, its small base, of initial length w2, and its height, of initial value h.

So, in the prior art, a type of geometry is fixed from the start (for example, a rectangle or a trapezium) and the parameters of this geometry are adjusted as a function of the result of comparison between the signature of the ideal object and the experimental signature.

When the RCWA method or the differential method is used, it is necessary, as has been seen, to pass through an intermediate phase of cutting-up.

This cutting-up phase is obligatory and seems to be more of a disadvantage which has to be accommodated when such numerical methods are used, rather than a useful step.

In the present invention, this step of cutting-up is used shrewdly, by considering that the geometrical object which is sought is the cut-up object itself. If it is desired to trace the connection between conventional method and a process according to the invention, it will be said that in this process the starting object is a pile of rectangles, and that the number of parameters is twice the number of rectangles.

Figure 4:
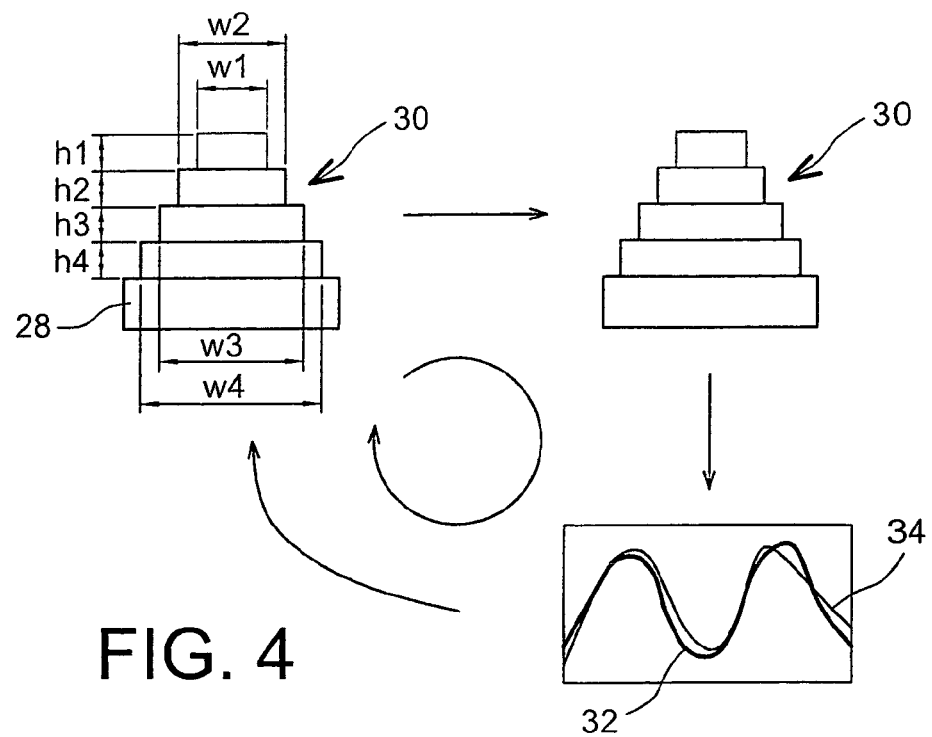

The initial phase of cutting-up therefore has no place in this process, since the object is already constituted by rectangles which may be directly exploited by the RCWA. This aspect of the invention is schematically illustrated by FIG. 4. Seen there is a process of adjustment by means of an object which is formed on a substrate 28 and whose profile is defined by a family of rectangles 30.

In the example considered, this family comprises four rectangles, each of these being characterised by a height $h_i$ and a width $w_i$, i running from 1 to 4.

Without doing anything, the geometry defined by the parameters $h_i$, $w_i$ changes to a cut-up geometry. Then, as has been seen above, the theoretical signature 32 is calculated, and is compared with the experimental signature 34. A variation of parameters is deduced from the difference of these signatures.

The process is then repeated with a new geometry defined by the modified parameters, and so on, until the difference between the theoretical signature and the experimental signature is below a predefined threshold.

At first sight, the use of objects defined by a family of rectangles has no advantages. On the contrary, the problem with three variables in the example of FIG. 3 becomes a problem with eight variables in the example of FIG. 4.

Nevertheless, an important advantage results from it: the sets of sequences of additions of variables then become evident, given that an object with n rectangles is more complex than an object with m rectangles if n>m (reference is made to the example of the invention, given hereinafter).

The advantage of using sequences of additions of variables falls out immediately: there are fewer problems due to multiple solutions, because of the increased number of parameters of the geometry, and the calculation time is reduced (reference is also made to the example of the invention given hereinafter).

The invention will now be described in a simple case relating to a lithographic pattern and in which the RCWA method and a rectangular base element are used.

No final profile (for example, trapezium or rounded trapezium) is fixed. The regression is always performed using sequences, but the number of sequences is not fixed (it may be very large), contrary to the research methods for which the final profile is fixed. The regression is ended when the difference between the theoretical spectrum and the measured spectrum is sufficiently small, the limiting difference being fixed by the user.

Figure 5A:
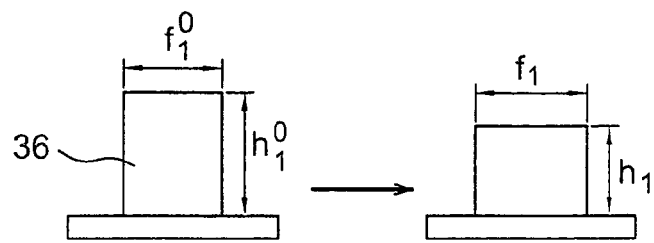

The basic principle of the iterations is as follows:

1. A rectangular starting object 36 (see FIG. 5A) is close enough to the object having sides $h^0_1$ (height) and $f^0_1$ (width) which is to be found (and which is for example defined by the manufacturing process) and, using a regression program, the height and width of the rectangle are adjusted to give best coincidence of the theoretical spectrum and the experimental spectrum. This constitutes the first sequence, which is denoted $(h_1, f_1)$. This sequence is known in the state of the art.

Figure 5B:
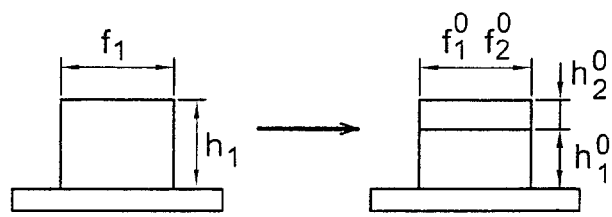

2. Once the best rectangle has been found (having height $h_1$ and width $f_1$), this rectangle is split into several rectangles, for example two rectangles (FIG. 5B). The parameters (height and width) of these two rectangles are denoted by $h^0_k$ and $f^0_k$, where k takes the values 1 and 2.

Figure 5C:
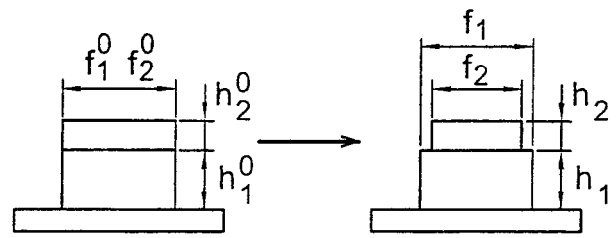

3. The 2×l variables $h^0_k$ and $f^0_k$, where l is the number of slices (here l=2), are adjusted for best coincidence of the theoretical and experimental spectra for each slice. This adjustment leads to the parameters $(h_1, f_1)$ and $(h_2, f_2)$ for the slices (FIG. 5C).

Figure 5D:
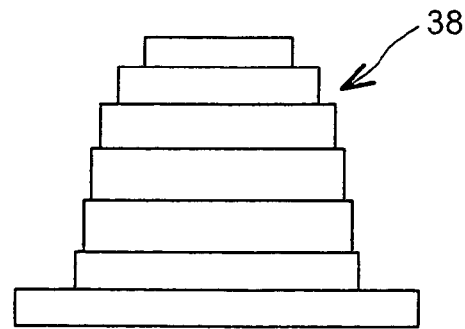

4. The operations of subdivision and adjustment are repeated until theory and experiment are in agreement. A profile is obtained in this way of the kind of profile 38 of FIG. 5D.

In conclusion, the solution found is a set or rectangles which form an image of the profile, and not a set of parameters of a fixed geometrical profile.

Four particular embodiments of the process according to the invention are described below.

Two of these embodiments use rectangles as base elements, and the two other embodiments use trapezia. As a method of field calculation, the RCWA method is used in the case of rectangles, and the differential method in the case of trapezia (but this is not necessary).

These embodiments are described for the characterisation of two important structures, namely lithographed resist profiles and notched grids.

The usable regression algorithms are numerous; only some of them are cited which are already widely used in scatterometry:

the Simplex method (see chapter 10 of document [4]), the Levenberg-Marquardt method (see chapter 10 of document [4]), and the Drège method (see document [5]).

The use of one or other of these does not modify the invention in any way.

The use of rectangular base elements and the characterisation of the shape of resist lines are first considered.

This type of profile is very frequently encountered during exposure and engraving of resist patterns (by electron beam or photolithography). The characterisation of this step is fundamental in microelectronics, because a large part of the remainder of the pattern manufacturing process depends on it. In fact, in general the first step of this process is concerned.

The corresponding embodiment has already been described hereinabove with reference to FIGS. 5A-5D. The primitive object is constituted by a single rectangle. For the subdivision of the different rectangles, there could be chosen, between each sequence, for example:

(1) to cut up all the rectangles indiscriminately, or (2) to cut up the rectangle having the greatest height, or (3) to cut up the rectangle whose variation induces the greatest variation in the global signature, or (4) to cut up the rectangles whose size is greater than a certain value (it is useless to cut up a rectangle which is already very small), or (5) to perform this operation on a sub-family of rectangles.

In general, solution (3) will mostly be chosen.

We now consider the characterisation of notched grids, always with the use of rectangular base elements.

For a few years, these structures have become of great importance in microelectronics. They are lines constituted by a very fine base (a few tens of nanometers in width) on which rests a wider line, the shape of which is more or less rounded.

In practice, two items of information are of interest, namely the respective sizes of the upper and lower portions and the shape of the upper portion. A big problem for the final users is finding a good geometric model for the shape of the upper portion.

Figure 6:
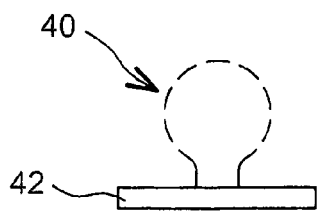

FIG. 6 shows an example of notched grid geometry 40, formed on a substrate 42.

For such a geometry, the sequences of a process according to the invention are easy to determine. FIGS. 7A-7F are referred to, which schematically show a set of such sequences, permitting the characterisation of a notched grid. The geometry of the dashed grid 44 is only there for facilitating comprehension of FIGS. 7A-7F. In no case does it enter into the sequences.

Figures 7A, 7B:
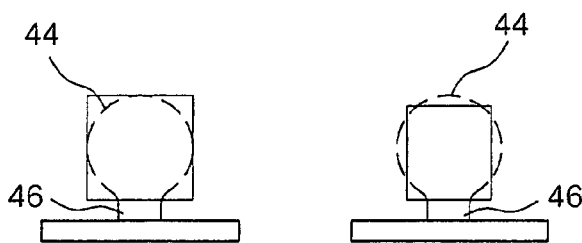
Figures 7C, 7D:
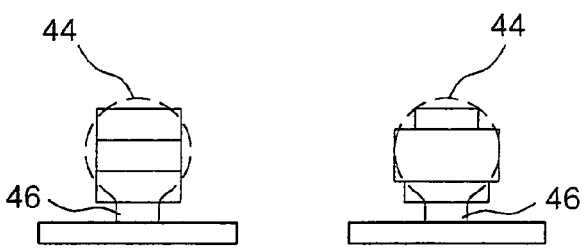
Figures 7E, 7F:
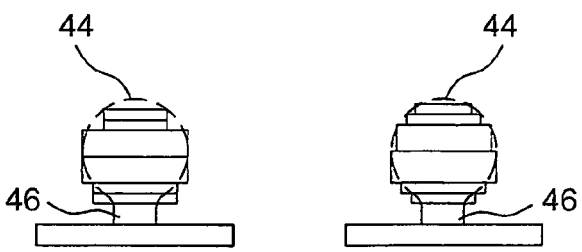

The first sequence comprises an initialisation phase (FIG. 7A) followed by an adjustment phase (FIG. 7B); the second sequence comprises a subdivision phase (FIG. 7C) followed by an adjustment phase (FIG. 7D); the third sequence comprises a new subdivision phase FIG. 7E) followed by a new adjustment phase (FIG. 7F); and so on.

At the end of a few sequences, a family of rectangles is obtained which tends to be adjusted to the desired geometric shape.

In this embodiment, the following facts will be noted:

the base 46 is never cut up; in fact, the optical signatures are often little affected by the base of the geometry (particularly if this base is of small size); and during the second sequence, the upper rectangle is cut up into three rectangles, because geometries of circular type are much better decomposed into unit cells with three than with two rectangles; it has thus been possible to skip the sequence with two rectangles.

The use of trapezoidal base elements will now be considered.

In fact, the same type of structure as before could be studied, following the same principle but with a different type of elementary pattern, for example the trapezium. An object is represented more finely with trapezoidal elements than with rectangles (with a constant number of elements). However, this leads to longer calculation times, since the differential method is then used, which is more complex. This why the RCWA method is the most used.

However, it should be noted that the principles stated above may be implemented with a trapezoidal base element, the only difference being that in this case, the base element is described by three parameters, for example the height h, the width $w_b$ of the large base, and the width $w_t$ of the small base of the trapezium.

Reference is made to FIGS. 8A-8F which schematically show another set of sequences of a process according to the invention, enabling the characterisation of a notched grid. The geometry of the dashed grid 48 is only there to facilitate comprehension of FIGS. 8A-8F. In no case does it enter into the sequences.

The first sequence comprises an initialisation phase (FIG. 8A) followed by an adjustment phase (FIG. 8B); the second sequence comprises a subdivision phase (FIG. 8C) followed by an adjustment phase (FIG. 8D); the third sequence comprises a new subdivision phase FIG. 8E) followed by a new adjustment phase (FIG. 8F); and so on.

At the end of a few sequences, a family of trapezia is obtained which tends to be adjusted to the sought geometric shape.

There are two notable differences between the present invention and the prior art.

On the one hand, the concept of scatterometry by adjustment (whether regressions or a search in a library is concerned) is completely different: the set is no longer sought of parameters of fixed form, parameters which enable adjustment of spectra, but the geometrical model itself which is defined by a set of base elements.

This is very important from the user's viewpoint, since, specifically, he does not always know what the form of the object to be characterized will be. If the chosen model is too simple, the results will be very approximate the shape of the object will be which he desires to characterise; and if the chosen model is too complex, the results may be false.

With the present invention, the model is adapted as the convergence takes place.

On the other hand, from the viewpoint of the RCWA resolution method, the cutting into slices is always considered to be a disadvantage in the prior art, since the cutting-up algorithms are complex and since it is always questioned whether the cutting-up fixed by the user is sufficient.

In the present invention, this disadvantage is transformed into an advantage, because it is from the cutting-up itself that the information results. The RCWA method is therefore well adapted to this method of "shape measurement".

The advantages of the present invention are therefore as follows:

the geometric model is not fixed, which is very practical for the final user;

at the end of the process, the user does not obtain a list of parameters of a predefined geometrical model, but an image of the profile;

the model becomes refined continuously, and the number of slices is, by construction, always optimum: this is not the case for the conventional methods, in which the starting models may be very complex and the number of slices may therefore be very large, hence a longer calculation time;

the problem of local minima which occurs when the number of parameters is large is avoided—to a certain degree—because this number increases continuously;

the resolution of the final geometry is theoretically unlimited, because the number of rectangles which describe the geometry may be increased at will; and if the method of calculating the signatures is the RCWA method, the profile is then cut up beforehand and consequently is optimum.

The series of sequences which is illustrated in FIGS. 7A-7F is not the most general: nothing prevents commencing with more rectangles if the information on the profile is already available. For example, for the notched lines for which the profile base is very small, the algorithm may be commenced with two or three rectangles.

Furthermore, according to particular embodiments of the process according to the invention, which are very advantageous for scatterometry, (a) the RCWA method is used, which is more rapid and simple than the differential method (but requires more base elements);

(b) the Drège regression method is used; and (c) the electromagnetic properties of the rectangles are stored.

Indeed, the RCWA method uses the rectangles as base objects. It is therefore well suited for the implementation of an algorithm according to the invention.

In the Drège regression method (see document [5]), the evaluation of the difference (point to point) between the experimental and theoretical signatures, combined with the evaluation of the derivative of the signatures when one of the parameters changes, leads to a very rapid convergence in a majority of cases.

It is however suitable to note that this method requires a complex electromagnetic calculation each time it is desired to calculate a derivative, which takes time except in the case of rectangles; as will be seen later, the derivative of the diffraction matrix of a rectangle with respect to its height or with respect to its width may be calculated in a very reduced time.

The storage of the electromagnetic properties of the rectangles enables the calculation to be notably accelerated. This storage rests on the fact that certain electromagnetic properties of rectangles, namely the eigenvalues and the eigenvectors of the electromagnetic field are independent of the height of the rectangles.

It is therefore advantageous to calculate and to store in a library the eigenvalues and the eigenvectors of a rectangle. When the eigenvalues and the eigenvectors of a rectangle are needed, it is then sufficient to seek them in the library in which they are stored.

Figure 9:
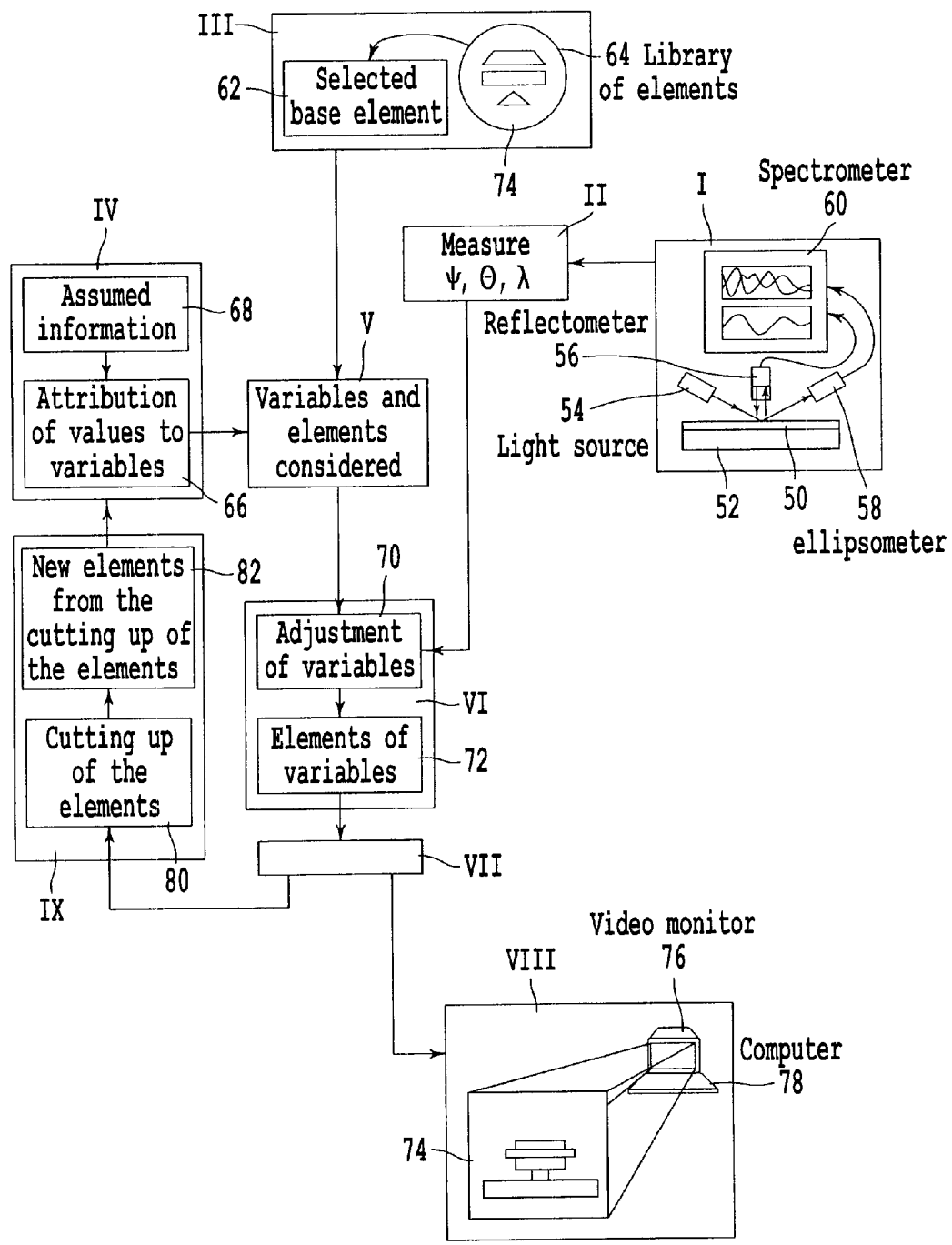

FIG. 9 shows the flow chart of a process according to the invention in the form of blocks.

Block I schematically shows the acquisition of data by means of an appropriate optical device. A structure 50 which it is desired to characterise is formed on a substrate 52. A light source 54 enables illuminating the structure 50. The light reflected by the latter is detected by a reflectometer 56 and by an ellipsometer 58. The signals provided by these are transmitted to a spectrometer 60.

Block II symbolises the measurements $\Psi$ thus obtained and the conditions of measurement $\theta$ (angle of incidence of the light on the structure) and $\lambda$ (wavelength of this light), which are stored.

In block III, the sub-block 62 represents the choice of a base element from a library 64 of elements.

In block IV, the sub-block 66 symbolises the attribution of values to variables, starting from assumed information 68 on the object to be characterised.

Block V symbolises the variables and elements considered and the values attributed to the variables.

Block VI shows a sub-block 70 for adjustment of variables, starting from the information of blocks II and V, and a sub-block 72 of elements of variables and of new values of variables resulting from adjustment.

This block VI is a regression block which is not detailed because it uses standard regression procedures already mentioned above.

Block VII symbolises a test (comparison of the difference between the theoretical and experimental optical responses at a predefined threshold) which enables knowing whether the adjustment is satisfactory (difference lower than threshold).

If this is the case, go to block VIII; the image of the object is considered to be the set of elements obtained by regression and this image 74 is displayed by means of a video monitor 76 which is connected to a computer 78 enabling all the calculations and data processing for characterisation.

In the opposite case, go to block IX whose sub-block 80 symbolises the cutting-up of the elements into new elements and sub-block 82 symbolises the new elements, the new variables and the indeterminate values resulting from this cutting-up.

Starting from these new elements, new variables, and indeterminate values (sub-block 82), the process is recommenced starting from sub-block 66 of block IV.

It is stated that in FIG. 9 there is also seen an example of the device according to the invention. comprising the light source 54, the reflectometer 56, the ellipsometer 58, the spectrometer 60, the computer 78 provided with a video monitor 76, the computer 78 having in memory the library 64 and processing data provided by the spectrometer 60 by implementing the process according to the invention which has been described with reference to blocks I-IX.

In the examples of the invention given above, the reflected image of a structure to be characterised is used as the optical response, this image resulting from the reflection of light by this structure. However, the invention may also be implemented by using, as the optical response, the diffracted image of a structure, resulting from the diffraction of light by this structure.

Moreover, examples of the invention have been given using rectangles and trapezia as base elements. However, the invention may also be implemented using a square as base element and the length of side of this square as the geometrical parameter.

A triangle may also be used as the base element and, as geometrical parameters, the base, an angle adjacent to this base, and the height of the triangle, or the base and two angles adjacent to the latter.

FIG. 10 shows a process of geometrical characterisation of a structure, wherein the structure is illuminated. This structure then provides an optical response. This process enables a two-dimensional or three-dimensional image of the structure to be obtained by starting from the optical response of this structure. This process includes the following successive steps: (step 1) acquiring the optical response of the structure, (step 2) defining an elementary geometrical structure as a base element capable of enabling decomposition of the structure to be characterised into one or more base elements, (step 3) determining at least one geometrical parameter of the base element and attributing a value to each geometrical parameter, (step 4) implementing a regression of the values of the geometrical parameter(s) of the base element starting from a regression algorithm capable of determining modified values of said geometrical parameter(s) in order to make a difference between a theoretical optical response of the base element, whose geometrical parameter(s) has (have) been determined, and the acquired optical response of the structure at most equal to a determined threshold value, and (step 5) if this difference between the theoretical optical response and the acquired optical response is greater than this threshold value, making a new subdivision of one or more base elements into at least two other base elements, and for each base element the process is recommenced starting from (step 3) thereof; if the difference is less than or equal to the threshold value, a set of base elements is assembled with the determined values of their geometrical parameters to obtain an image of the structure, and if the difference is greater than the threshold value, the process is recommenced at (step 5).

The documents cited in the present description are the following:

[1] B. K. Minhas, S. A. Coulombe, S. Schail, H. Naqvi and J. R. McNeil, Ellipsometric scatterometry for the metrology of sub-0.1 μm, Applied Optics 37(22), pages 5112 to 5115, 1998

(2) Thomas K. Gaylord and M. G. Moharam, Analysis and applications of optical diffraction by gratings, Proceedings of the *IEEE*, 73(5), 1985

(3) L. C. Botten, M. Cadihac, G. H. Derrick, D. Maystre, R. C. McPhedran, M. Nevière, R. Petit and F. Vincent, Electromagnetic Theory of Gratings, Topics in Current Physics, Springer-Verlag Berlin Heidelberg New York, R. Petit Edition, 1980

(4) H. Press, A. Teukolsky, T. Vetterling and F. Flannery, Numerical Recipes in C, Cambridge University Press, 1992

(5) E. M. Drège, J. A. Reed and D. M. Byrne, Linearized inversion of scatterometric data to obtain surface profile information, *Opt. Eng.*, 41(1), pages 225-236, January 2002

(6) Evgeni Popov and Michel Nevière, Grating Theory: new equations in Fourier space leading to fast converging results for TM polarization, J. Opt. Soc. Am. A, Vol. 17, No. 10, October 2000, pages 1773-1784.

The invention claimed is:

1. A process of geometrical characterisation of a structure, wherein the structure is illuminated, this structure then providing an optical response, this process enabling a two-dimensional or three-dimensional image of the structure to be obtained starting from the optical response of this structure, this process being characterised in that it comprises the following successive steps:

(1) acquiring the optical response of the structure,
(2) defining an elementary geometrical structure, as a base element capable of enabling decomposition of the structure to be characterised into one or more base elements,
(3) determining at least one geometrical parameter of the base element and attributing a value to each geometrical parameter,
(4) implementing a regression of the values of the geometrical parameter(s) of the base element starting from a regression algorithm capable of determining modified values of said geometrical parameter(s) in order to make a difference between a theoretical optical response of the base element, whose geometrical parameter(s) has (have) been determined, and the acquired optical response of the structure at most equal to a determined threshold value, and
(5) if the difference between the theoretical optical response and the acquired optical response is greater than this threshold value, making a new subdivision of one or more base elements into at least two other base elements, and for each base element recommencing the process starting from step (3) thereof; if the difference is less than or equal to the threshold value, assembling a set of base elements with the determined values of their geometrical parameters to obtain an image of the structure, and if the difference is greater than the threshold value, recommencing the process at step (5).

2. The process according to claim 1, wherein the optical response of the structure is an ellipsometric, reflectometric, or goniometric spectrum, or an image of the structure.

3. The process according to claim 1, wherein an analysis method of coupled waves, or a differential method is used to determine the theoretical optical response of the base element.

4. The process according to claim 1, wherein the base element is chosen from among squares, rectangles, trapezia and triangles, or any other base element capable of enabling the decomposition of the structure.

5. The process according to claim 4, wherein the base element is a square and a length of sides of the square is used as the geometrical parameter.

6. The process according to claim 4, wherein the base element is a rectangle, and at least one of the length and width of the rectangle is used as a geometric parameter.

7. The process according to claim 4, wherein the base element is a trapezium, and at least one of the height and respective lengths of large and small bases of the trapezium are used as geometric parameters.

8. The process according to claim 4, wherein the base element is a triangle, and at least one of a base, an angle adjacent to the base, a height of the triangle, and two angles adjacent to the base is used as a geometric parameter.

9. A device for the geometric characterisation of a structure, this device comprising:
   means for illuminating the structure, this structure then providing an optical response, and
   means for detecting and processing this optical response,
   wherein the means for detecting and processing the optical response also perform the following successive functions of:
   (1) acquiring the optical response of the structure,
   (2) defining an elementary geometrical structure, as a base element, capable of permitting decomposition of the structure to be characterised into one or more base elements,
   (3) determining at last one geometrical parameter of the base element and attributing a value to each geometrical parameter,
   (4) implementing a regression of the values of the geometrical parameter(s) of the base element, starting from a regression algorithm capable of determining modified values of the geometrical parameter(s), in order to make a difference between a theoretical optical response of the base element, whose geometrical parameter(s) have been determined, and the acquired optical response of the structure at most equal to a determined threshold value, and
   (5) if this difference between the theoretical optical response and the acquired optical response is greater than this threshold value, making a new subdivision of one or more base elements into at least two other base elements, and for each base element, recommencing the steps starting from (3), if the difference is less than or equal to the threshold value, assembling a set of base elements with the determined values of their geometrical parameters to obtain an image of the structure, and if the difference is greater than the threshold value, recommencing the steps starting from (5).

* * * * *